US010500683B2

(12) United States Patent
Koehne et al.

(10) Patent No.: US 10,500,683 B2
(45) Date of Patent: Dec. 10, 2019

(54) METHODS OF MANUFACTURING A TANDEM GUIDE VANE SEGMENT

(71) Applicant: Rolls-Royce Deutschland Ltd & Co KG, Blankenfelde-Mahlow (DE)

(72) Inventors: Oliver Koehne, Berlin (DE); Felix Goeppinger, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 152 days.

(21) Appl. No.: 15/650,235

(22) Filed: Jul. 14, 2017

(65) Prior Publication Data
US 2018/0021899 A1    Jan. 25, 2018

(30) Foreign Application Priority Data

Jul. 22, 2016 (DE) .................. 10 2016 113 568

(51) Int. Cl.
*F01D 9/04*     (2006.01)
*B23P 15/02*    (2006.01)
(Continued)

(52) U.S. Cl.
CPC .............. *B23P 15/02* (2013.01); *F01D 5/146* (2013.01); *F01D 9/042* (2013.01); *F01D 9/044* (2013.01); *B23C 2215/44* (2013.01); *B23P 15/006* (2013.01); *F05D 2220/32* (2013.01); *F05D 2230/10* (2013.01); *F05D 2230/21* (2013.01);
(Continued)

(58) Field of Classification Search
CPC ........ B23P 15/02; B23P 15/006; F01D 9/042; F01D 5/146; F01D 9/044; F05D 2230/232; F05D 2240/12; F05D 2230/21; F05D 2230/10; F05D 2220/32; B23C 2215/44

See application file for complete search history.

(56) References Cited

U.S. PATENT DOCUMENTS 4,652,208 A    3/1987  Tameo
4,874,287 A   10/1989  Grieb
(Continued)

FOREIGN PATENT DOCUMENTS

DE    102012215412       3/2014
EP       2921714 A1      9/2015
(Continued)

OTHER PUBLICATIONS

European Search Report dated Mar. 27, 2018 from counterpart European App No. 17182137.4.
(Continued)

*Primary Examiner* — Jun S Yoo
(74) *Attorney, Agent, or Firm* — Shuttleworth & Ingersoll, PLC; Timothy J. Klima

(57) ABSTRACT

Methods for manufacturing a tandem guide vane segment that includes an outer platform, a front guide vane, and a rear guide vane, wherein the front guide vane and the rear guide vane are arranged in a firmly fixated manner with respect to one another. One method includes manufacturing an integral front segment section that includes the front guide vane and a front section of the outer platform, manufacturing an integral rear segment section that includes the rear guide vane and a rear section of the outer platform, and connecting the two segment sections to each other.

6 Claims, 8 Drawing Sheets

(51) Int. Cl.
*F01D 5/14* (2006.01)
*B23P 15/00* (2006.01)

(52) U.S. Cl.
CPC .... *F05D 2230/232* (2013.01); *F05D 2240/12* (2013.01)

(56) References Cited

U.S. PATENT DOCUMENTS

| | | | |
|---|---|---|---|
| 6,099,245 | A | 8/2000 | Bunker |
| 9,366,148 | B2 | 6/2016 | Clemen |
| 2002/0197157 | A1 | 12/2002 | Dodd |
| 2004/0031260 | A1 | 2/2004 | Orlando et al. |
| 2006/0018753 | A1 | 1/2006 | Menian |
| 2008/0134685 | A1 | 6/2008 | Bunker et al. |
| 2015/0000268 | A1* | 1/2015 | Clancy ............... F02B 37/24 60/598 |
| 2015/0027131 | A1* | 1/2015 | Takeda ............... B23P 6/00 60/805 |
| 2015/0252674 | A1* | 9/2015 | Johann ............... B22F 3/225 416/175 |
| 2015/0267546 | A1 | 9/2015 | Guemmer |
| 2015/0267548 | A1 | 9/2015 | Guemmer |
| 2016/0061205 | A1 | 3/2016 | Pereira et al. |
| 2016/0108735 | A1 | 4/2016 | Forcier et al. |
| 2016/0177728 | A1 | 6/2016 | Tanimitsu |

FOREIGN PATENT DOCUMENTS

| | | |
|---|---|---|
| EP | 2921716 A1 | 9/2015 |
| GB | 2405184 A | 2/2005 |
| RU | 2269678 C1 | 2/2006 |
| WO | WO15072256 | 5/2015 |

OTHER PUBLICATIONS

European Search Report dated Mar. 11, 2019 for counterpart European Patent Application No. EP18204607.8.
European Search Report dated Nov. 24, 2017 from counterpart European App No. 17182137.4.
German Search Report dated Jun. 6, 2017 for counterpart German Application No. DE 10 2016 113 568.2.
Goeppinger, Felix Anton; Bachelor Thesis; "Conceptual Design Study and Assessment of Methods of Manufacture of Tandem Stator"; Jun. 10, 2016; Berlin, Germany.

* cited by examiner

METHODS OF MANUFACTURING A TANDEM GUIDE VANE SEGMENT

REFERENCE TO RELATED APPLICATION

This application claims priority to German Patent Application No. 10 2016 113 568.2 filed on Jul. 22, 2016, the entirety of which is incorporated by reference herein.

BACKGROUND

The invention relates to methods for manufacturing a tandem guide vane segment. Such guide vane segments are used in a compressor of a gas turbine in order to form a blade row group.

Tandem guide vanes have advantages with respect to aerodynamics when it comes to the construction of axial compressors in gas turbines. Tandem guide vane segments are known from US 2015/027131 A1, for example.

So far, tandem guide vanes have been primarily described with respect to their structural design, for example with respect to vane overlap, gap width, and stagger angle. What is required are methods by means of which tandem guide vanes can be provided in an effective manner.

The present invention is based on the objective to specify methods for manufacturing a tandem guide vane segment.

SUMMARY

The tandem guide vane segment to be manufactured comprises an outer platform, a front guide vane, and a rear guide vane, wherein the front guide vane and the rear guide vane are arranged in a firmly fixated manner with respect to one another and form a gap in between them. The front guide vane and the rear guide vane can be arranged either in an overlapping manner or with an axial distance to each other. Further, the tandem guide vane segment to be manufactured can have an inner platform, which constitutes a component of an inner tip shroud.

According to a first aspect of the invention, a method for manufacturing a tandem guide vane segment is provided in which an integral intermediate structure is initially manufactured. Here, manufacturing an integral intermediate structure means that the intermediate structure is formed in one piece. It is provided that the integral intermediate structure has material areas that comprise the final outer platform, the final front guide vane, and the final rear guide vane. At that, in the intermediate structure, the gap between the final front guide vane and the final rear guide vane is filled with the material of the intermediate structure.

The shape and dimensions of the final product are made from the integral intermediate structure by means of further processing steps. Thus, the intermediate structure is further processed into the final tandem guide vane segment, wherein a gap between the front guide vane and the rear guide vane is created during further processing, and in this manner the front guide vane is separated from the rear guide vane and both are defined as separate elements.

At that, the further processing of the intermediate structure into the final tandem guide vane segment can comprise the use of further methods such as for example the use of cutting methods for providing the final shape of the individual components of the tandem guide vane segment.

According to one embodiment, it is provided that the manufacturing of an integral intermediate structure is carried out by means of forging or casting. Here, principally any casting method, for example metal powder injection molding, can be used. For example, the forming of the gap can be carried out by means of milling or by means of an erosion method, for example a discharge machining method.

In one embodiment of the invention it is provided that the tandem guide vane segment to be manufactured additionally comprises an inner platform. Such a platform forms a section of an inner tip shroud of the compressor stage. Here, it is provided that the inner platform is also provided by the integral intermediate structure, and is subsequently processed further to shape its exact contours.

According to a second aspect of the invention, a method for manufacturing a tandem guide vane segment is provided in which the front guide vane and the rear guide vane overlap each other in the axial direction. The method comprises the manufacturing of an integral front segment section that comprises the front guide vane and a front section of the outer platform. Further, an integral rear segment section is manufactured which comprises the rear guide vane and a rear section of the outer platform. Subsequently, the two segment sections are connected to one another.

Thus, according to this second aspect of the invention, an integral front segment section and an integral rear segment section are manufactured separately and connected to each other.

For this purpose, it is provided in one embodiment variant that in the area of the outer platform, the front segment section forms a rear limiting line to the rear segment section, which extends substantially in the circumferential direction, in the area of the outer platform, the rear segment section forms a front limiting line to the front segment section, which extends substantially in the circumferential direction, the two limiting lines are formed in an S-shaped or Z-shaped manner, wherein the front guide vane does not protrude beyond the rear limiting line, and the rear guide vane does not protrude beyond the front limiting line, and the two segment sections are connected to each other along the two limiting lines.

Here, it is pointed out that strictly speaking the mentioned limiting lines are boundary surfaces that extend in the radial direction and form a front side of the outer platform. The two limiting lines are formed by means of cutting methods, for example. They are connected to each other at their front sides, for example by means of hard soldering or other thermal bonding techniques (e.g. welding).

The embodiment of the front segment section and of the rear segment section so that they have an S-shaped or Z-shaped boundary to the axially adjacent segment section in the area of the outer platform is accompanied by the advantage that the axial projection in the direction of the axially adjacent segment section provided by the S-shape or Z-shape can be used for arranging the guide vane in an overlapping manner with the guide vane of the adjacent segment section, without the latter protruding, i.e. without the front guide vane axially projecting beyond the rear limiting line of the front segment section, and the rear guide vane axially projecting beyond the front limiting line of the rear segment section. In this way, it can be avoided that protruding guide vanes are manufactured.

A further advantage of this arrangement consists in the fact that the two segment sections can be positioned in an exact manner with respect to one another due to the S-shape or Z-shape of the limiting lines at which they are connected to each other. For, a stop collar is provided due to this shape, making it possible to position the two segment sections and thus also the two guide vanes in an exact manner relative to each other.

In a further embodiment variant, it is provided that
in the area of the outer platform, the front segment section forms a rear limiting line to the rear segment section, extending substantially in the circumferential direction,
in the area of the outer platform, the rear segment section has a front limiting line to the front segment section, extending substantially in the circumferential direction,
the two limiting lines are formed in a rectilinear manner, wherein the front guide vane protrudes beyond the rear limiting line, and/or the rear guide vane protrudes beyond the front limiting line, and
the two segment sections are connected to each other along the two limiting lines.

In this embodiment it is thus provided that the two segment sections form limiting lines that extend in a rectilinear manner in the circumferential direction. In order to still obtain overlapping of the front guide vane and the rear guide vane, it must be provided in this embodiment that the front guide vane protrudes beyond the rear limiting line, and/or the rear guide vane protrudes beyond the front limiting line. This is accompanied by a small gap being provided between the trailing edge of the front guide vane and the outer platform in the protruding section, and/or by a small gap being provided between the leading edge of the rear guide vane and the outer platform in the protruding section.

It can be provided that the tandem guide vane segment to be manufactured additionally comprises an inner platform, wherein the front segment section further comprises a front section of the inner platform, and the rear segment section further comprises a rear section of the inner platform. In this manner, an integral front segment section and an integral rear segment section, which respectively also comprise a section of the inner platform, are provided separately and connected to each other.

According to the described embodiment variants, it is provided for this case that the limiting lines are also formed in an S-shaped or Z-shaped manner (without protruding guide vanes) or alternatively are formed in a straight manner (with protruding guide vanes) in the area of the inner platform.

According to a further embodiment of the invention, it is provided that the tandem guide vane segment to be manufactured additionally comprises an inner platform, wherein the inner platform is formed so as to be integral only with the front segment section. The inner platform is thus connected only with the front segment section. The integral rear segment section comprises the rear section of the outer platform as well as the rear guide vane that is embodied as a cantilever and is correspondingly formed at the hub side without any further structure.

According to a third aspect of the invention, a method for manufacturing a tandem guide vane segment is provided that comprises manufacturing at least one of the guide vanes as a separate structural component, and connecting the guide vane manufactured as a separate structural component to at least one of the other structural components.

Thus, the third aspect of the invention is based on the idea of manufacturing at least one of the guide vanes as a separate structural component. In this manner, it is facilitated that this structural component is manufactured with a particularly high precision. This can for example be realized by means of forging, spray powder molding, and/or milling.

According to one embodiment variant of this third aspect of the invention, it is provided that all components are manufactured as separate structural components and are connected to each other by means of form fitting (e.g. plug-in connections) and/or welding or soldering. What is present according to this embodiment variant is a completely modular system, in which every component can be manufactured with a suitable method and from suitable material separately and with the final dimensions.

According to a further embodiment variant of this third aspect of the invention, it is provided that the outer platform and one of the guide vanes can be manufactured as an integral structural component, that the other guide vane is manufactured as a separate structural component, and that the other guide vane is connected with the integral structural component. Thus, in this embodiment variant, only one of the guide vanes is manufactured separately, wherein this may apply to the front or the rear guide vane.

For connecting a separately manufactured guide vane to the outer platform, it is provided in one embodiment of the invention that this connection of the guide vane to the outer platform is provided by a friction welding method. If the tandem guide vane segment additionally comprises an inner platform, the guide vane that is manufactured as a separate structural component is also connected to the inner platform by means of a friction welding method according to one embodiment. At that, linear as well as orbital friction welding methods can be used. In one embodiment, it is provided that the weld seam that is created in the course of the friction welding process is refinished, for example by means of milling over.

In a further embodiment, it is provided that respectively one recess, for example a slit, for attaching the front and the rear guide vanes is formed in the outer platform, respectively one outer projection, for example a spigot, is formed at the radially outer end of the front guide vane and the rear guide vane, and the front guide vane and the rear guide vane are connected to the outer platform by inserting the outer projection into the corresponding recess. In this manner, structures for a plug-in connection of guide vane and outer platform are provided. At that, it can be provided that the plug-in connections are further secured by means of welding or hard soldering, for example.

If the tandem guide vane segment additionally comprises an inner platform, the inner platform is also manufactured as a separate part. At that, structures for a plug-in connection are provided in a suitable manner in the inner platform and at the radially inner end of the guide vane.

In a further embodiment of the invention, it is provided that
the outer platform and one of the guide vanes are manufactured as an integral structural component, wherein an elongated reception structure, e.g. a longitudinal groove or a slit, is formed in the outer platform,
the other guide vane is manufactured as a separate structural component, wherein an outer connecting structure is formed at the radially outer end of the other guide vane, with the outer connecting structure being suitable for being inserted into an elongated outer reception structure of the outer platform, and
the other guide vane is connected to the integral structural component by being inserted with its outer connecting structure into the elongated reception structure of the outer platform.

If the tandem guide vane segment additionally comprises an inner platform, it is provided that the latter is manufactured as an integral structural component together with the outer platform and the one guide vanes. At that, the inner platform is also formed with an elongated reception structure into which a connecting structure, formed at the other guide vane at its radially inner end, can be inserted.

According to a fourth aspect of the invention, a method for manufacturing a tandem guide vane segment is provided, the method comprising:

manufacturing the outer platform and one of the guide vanes as the first integral structural component;

manufacturing the inner platform and the other guide vane as a second integral structural component;

connecting the two integral structural components by connecting the radially outer vane end of the other guide vane with the outer platform, and by connecting the radially inner vane end of the one guide vane with the inner platform.

Accordingly, this variant of the invention is based on the concept of connecting two integral structural components at which respectively one of the guide vanes is integrally formed. Here, the outer platform can for example be manufactured integrally with the front guide vane, and the inner platform is manufactured integrally with the rear guide vane (or the other way around).

The two integral structural components are for example connected by respectively inserting projections of the guide vanes into the recesses of the platforms, that is, by embodying structures that facilitate a plug-in connection.

Within the meaning of the present invention, the term "tandem guide vane segment" is to be understood to mean that the vane segment comprises at least one front and one rear guide vane, so that the blade row group that is formed from the segments comprises at least two blade rows. In general, one or multiple further guide vanes can be arranged between the front and the rear guide vane, in which case the put-together segments form a blade row group with more than two blade rows.

What is referred to as an outer platform is a structure that delimits the main flow path radially outwards in the area of a guide vane, and that is provided and suitable for the purpose of fixating a guide vane radially outside. Typically, the fixation is realized in a structure that is a part of the compressor housing, or is connected to the compressor housing. What is understood by an inner platform is a structure that delimits the main flow path radially inside. At that, the inner platform typically forms an integral part of a tip shroud arrangement.

It is to be understood that the outer and the inner platform can be configured so as to be firmly fixated or adjustable. In the latter case, the platforms are rotatably mounted in the hub and in the housing of the compressor, for example by means of trunnions.

In one embodiment of the invention, it is provided that the outer platform of the tandem guide vane segment is formed in a rectangular manner and has limiting lines that extend in a rectilinear manner in the axial direction. Such limiting lines that extend in a rectilinear manner in the axial direction have the effect that the limiting lines of the tandem guide vane segments, which are adjacent to each other in the circumferential direction, have no negative impact or only a minor negative impact from the aerodynamic point of view.

In a further embodiment of the invention, it is provided that a tandem guide vane segment comprises exactly one front guide vane and exactly one rear guide vane. This can be advantageous in embodiments of the invention. In another embodiment of the invention, it is provided that a tandem guide vane segment comprises multiple front guide vanes arranged at a distance from each other in the circumferential direction as well as multiple rear guide vanes arranged at a distance from each other in the circumferential direction, wherein one front guide vane and one rear guide vane respectively form a tandem vane. Thus, a tandem guide vane segment can have one or multiple tandem guide vanes in the circumferential direction. In an extreme case, a guide vane segment can extend over an angular range of 180° in the circumferential direction, so that only two guide vane segments are present.

The individual tandem guide vane segments are arranged next to each other in the circumferential direction and fixated at a housing structure, wherein they form a stator stage of an axial compressor comprising two guide vane rows that are formed by tandem guide vanes.

Generally, it is to be understood that as materials for the (stationary) tandem guide vane segments that are arranged in the rear of the flow path, nickel-based alloys (e.g. Inconel 718) can be used, for example. Further, for (optionally adjustable) tandem guide vane segments that are arranged in the front of the flow path, titanium alloys (Ti6/4) and steel alloys (A286) can be used, for example.

BRIEF DESCRIPTION OF THE DRAWINGS

The invention will be explained in more detail on the basis of exemplary embodiments with reference to the accompanying drawings in which:

FIG. 8b shows the finished manufactured tandem guide vane segment according to FIG. 8a;

DETAILED DESCRIPTION

Figure 1:
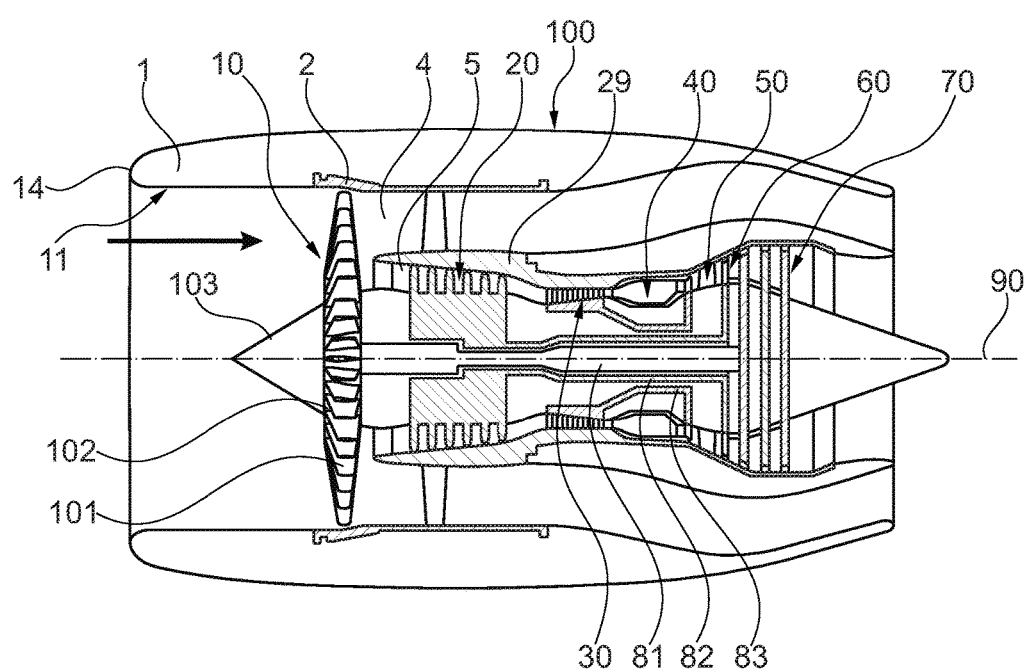
FIG. 1 shows a simplified schematic sectional view of a turbofan engine, in which tandem guide vane segments manufactured according to the present invention can be arranged.

FIG. 1 shows, in a schematic manner, a turbofan engine 100 that has a fan stage with a fan 10 as the low-pressure compressor, a medium-pressure compressor 20, a high-pressure compressor 30, a combustion chamber 40, a high-pressure turbine 50, a medium-pressure turbine 60, and a low-pressure turbine 70.

The medium-pressure compressor 20 and the high-pressure compressor 30 respectively have a plurality of compressor stages that respectively comprise a rotor stage and a stator stage. The turbofan engine 100 of FIG. 1 further has three separate shafts, namely a low-pressure shaft 81 which connects the low-pressure turbine 70 to the fan 10, a medium-pressure shaft 82 which connects the medium-pressure turbine 60 to the medium-pressure compressor 20, and a high-pressure shaft 83 which connects the high-pressure turbine 50 to the high-pressure compressor 30. However, this is to be understood to be merely an example. If, for example, the turbofan engine has no medium-pressure compressor and no medium-pressure turbine, only a low-pressure shaft and a high-pressure shaft would be present.

The turbofan engine 100 has an engine nacelle 1 that comprises an inlet lip 14 and forms an engine inlet 11 at the entry side, supplying inflowing air to the fan 10. The fan 10 has a plurality of fan blades 101 that are connected to a fan disc 102. Here, the annulus of the fan disc 102 forms the radially inner delimitation of the flow path through the fan 10. Radially outside, the flow path is delimited by the fan housing 2. Upstream of the fan-disc 102, a nose cone 103 is arranged.

Behind the fan 10, the turbofan engine 100 forms a secondary flow channel 4 and a primary flow channel 5. The primary flow channel 5 leads through the core engine (gas turbine) which comprises the medium-pressure compressor 20, the high-pressure compressor 30, the combustion chamber 40, the high-pressure turbine 50, the medium-pressure turbine 60, and the low-pressure turbine 70. At that, the medium-pressure compressor 20 and the high-pressure compressor 30 are surrounded by a circumferential housing 29 which forms an annulus surface at the internal side, delimitating the primary flow channel 5 radially outside. Radially inside, the primary flow channel 5 is delimitated by corresponding rim surfaces of the rotors and stators of the respective compressor stages, or by the hub or by elements of the corresponding drive shaft connected to the hub.

During operation of the turbofan engine 100, a primary flow flows through the primary flow channel 5. The secondary flow channel 4, which is also referred to as the partial-flow channel, sheath flow channel, or bypass channel, guides air sucked in by the fan 10 during operation of the turbofan engine 100 past the core engine.

The described components have a common symmetry axis 90. The symmetry axis 90 defines an axial direction of the turbofan engine. A radial direction of the turbofan engine extends perpendicularly to the axial direction.

What is relevant in the context of the present invention is the manufacturing of guide vane segments forming a stator stage in the compressor. Here, guide vane segments manufactured according to the invention are for example used in the medium-pressure compressor 20 or in the high-pressure compressor 30. According to the present invention, tandem guide vane segments having a front guide vane and a rear guide vane are manufactured, which are arranged in a firmly fixated manner with respect to one another.

Figure 2:
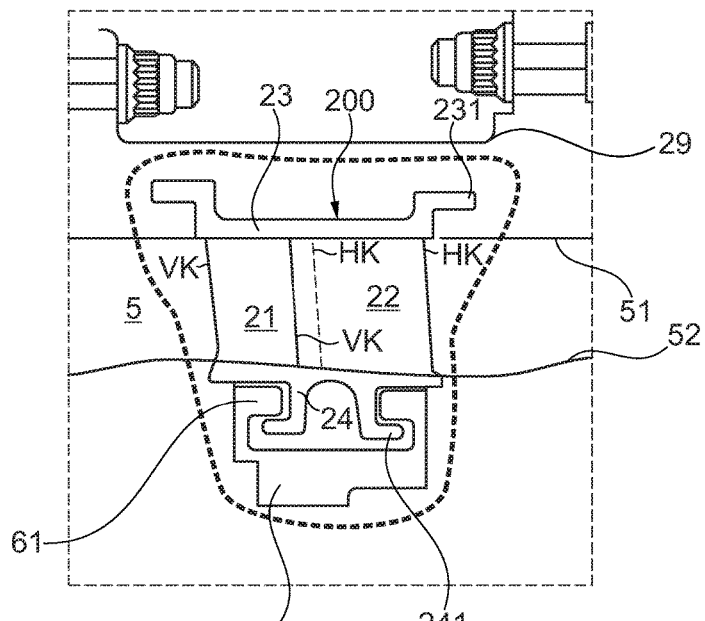
FIG. 2 shows, in a schematic manner, a tandem guide vane segment arranged inside a flow channel.
Figures 3A, 3B:
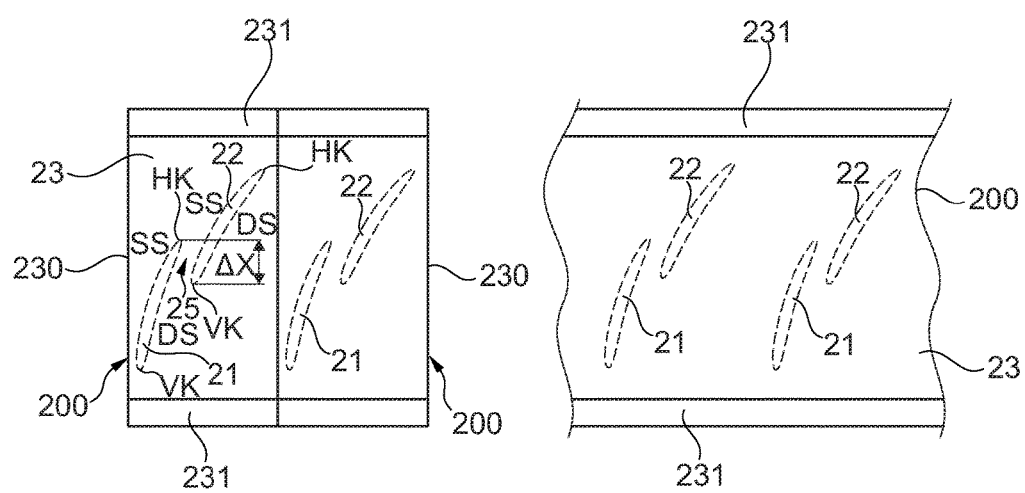
FIG. 3a shows, in a schematic manner, two tandem guide vane segments arranged next to each other in the circumferential direction, wherein each tandem guide vane segment comprises a tandem guide vane.
FIG. 3b shows, in a schematic manner, an arrangement of a tandem guide vane segment that extends in the circumferential direction and comprises multiple tandem guide vanes.

First, FIG. 2 and FIGS. 3a, 3b show the basic structure of a tandem guide vane segment. According to FIG. 2, a tandem guide vane segment 200 is arranged in the primary flow channel 5, which will also be referred to as the main flow path in the following. The main flow path 5 comprises a radially outer flow path boundary 51 and a radially inner flow path boundary 52. The radially outer flow path boundary 51 is formed by a housing 29 (for example the circumferential housing 29 of FIG. 1). The radially inner flow path boundary 52 is formed by a hub that is mounted so as to be rotatable around a rotor axis that extends in the longitudinal direction.

The tandem guide vane segment 200 has a front guide vane 21, a rear guide vane 22, an outer platform 23, and an inner platform 24. The guide vanes 21, 22 have one leading edge VK and one trailing edge HK, respectively. As is also shown in FIG. 3a, the trailing edge HK of the front vane 21 and the leading edge VK of the rear vane 22 overlap in the shown exemplary embodiment. However, this is not necessarily the case. In other exemplary embodiments, the trailing edge HK of the front vane 21 and the leading edge VK of the rear vane 22 are arranged at an axial distance to one another.

The outer platform 23 and the inner platform 24 form the main flow boundary 51, 52 in the area of the radially outer and the radially inner ends of the tandem guide vanes 21, 22.

At its axial front and rear ends, the outer platform 23 has attachment structures 231 that point away from each other in the axial direction and serve for fixating the outer platform 23 in the housing 29, so that the outer platform 23 is fixated in the surrounding structure. The inner platform 24 also has two attachment structures 241 pointing away from each other in the axial direction. They serve for being connected to a support 61 that has a rub coating 62 at its bottom side. The rub coating 62 is arranged opposite an adjoining surface of the rotating hub. The inner platform 24 and the support 61 with the rub coating 62 form an inner tip shroud construction that is embedded inside a cavity in the hub of the turbomachine.

It is pointed out that the shown structures of the outer platform 23 with the attachment structures 231 and the inner platform 24 with the attachment structures 241 are understood to be merely examples. For example, they can also be formed with facing attachment structures. For the present invention, the exact shape of the outer platform 23 and the inner platform 24 as well as of the attachment structures 231, 241 is not significant.

It is also to be understood that the tandem guide vane segments do not necessarily have to be provided with an inner tip shroud construction. In contrast to that, it can be provided in alternative embodiments that the guide vanes 21, 22 are free-standing at their radially inner ends, being separated from the rotating hub by a gap.

FIG. 3a shows two tandem guide vane segments 200 that are arranged next to each other in the circumferential direction. Here, the rendering shows the outer platform 23 with the attachment structures 231 in a top view. The front guide vane 21 and the rear guide vane 22 are shown by dashed lines. The inner platform is not shown. Here, the totality of the tandem guide vane segments 200 arranged in the circumferential direction forms a stator with two integrated blade rows.

As shown in FIG. 3a, it can be provided that a gap 25 is formed between the pressure side DS of the front vane 21 and the suction side SS of the rear vane 22, forming a passage between the two guide vanes 21 and 22. Here, the trailing edge HK of the front vane 21 and the leading edge VK of the rear vane 22 overlap in the axial direction by the amount Δx. However, as has already been mentioned, this is not necessarily the case. If the trailing edge HK of the front vane 21 and the leading edge VK of the rear vane 22 are arranged at a distance to each other in the axial direction, the gap is considered to be the area that extends between the trailing edge HK of the front vane 21 and the leading edge VK of the rear vane 22.

As can also be seen in FIG. 3a, the outer platform 23 is formed in a rectangular manner and respectively has two straight lateral boundaries 130 that extend in the axial direction. In alternative embodiments, it can be provided that the lateral boundaries extend obliquely with respect to the axial direction or have a wave-shaped extension.

The individual outer platforms 23 are arranged next to each other and are respectively fixated inside the housing. In addition, it can be provided that they are connected to each other along their lateral boundaries 130.

FIG. 3b shows an exemplary embodiment in which a tandem guide vane segment 200 has a larger extension in the circumferential direction and has two or more tandem guide vanes with respectively one front guide vane 21 and one rear guide vane 22.

Figure 4:
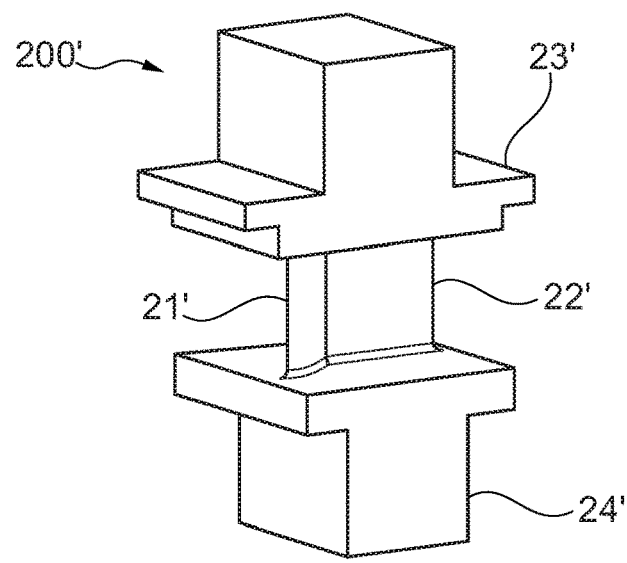
FIG. 4 shows an integral intermediate structure that is created by manufacturing a tandem guide vane segment according to a first manufacturing method.

FIG. 4 illustrates a first method for manufacturing a tandem guide vane segment. For manufacturing such a segment, initially an integral intermediate structure 200' is manufactured, which is shown in FIG. 4. The intermediate structure 200' is for example manufactured by means of forging or casting, for instance by means of metal powder injection molding. Here, it comprises all material areas that form the later tandem guide vane segment. Thus, it comprises an area 21' from which the final front guide vane is formed, an area 22' from which the final rear guide vane is formed, an area 23' from which the final outer platform is formed, and an area 24' from which the final inner platform is formed. Here, it is provided that, in the intermediate structure 200', the area in which a gap between the front guide vane and the rear guide vane is provided in the finished tandem guide vane segment is filled with material.

It is provided that the manufactured intermediate structure is further processed into the final tandem guide vane segment. At that, the further processing comprises manufacturing a gap in the intermediate structure 200' for separating the front guide vane 21 and the rear guide vane 22. This gap can be manufactured by means of milling or erosion, for example by means of a discharge machining method. Further, the guide vanes 21, 22 and the platforms 23, 24 can be submitted to further processing, in particular by means of cutting methods, so as to manufacture their final shape.

Figure 5:
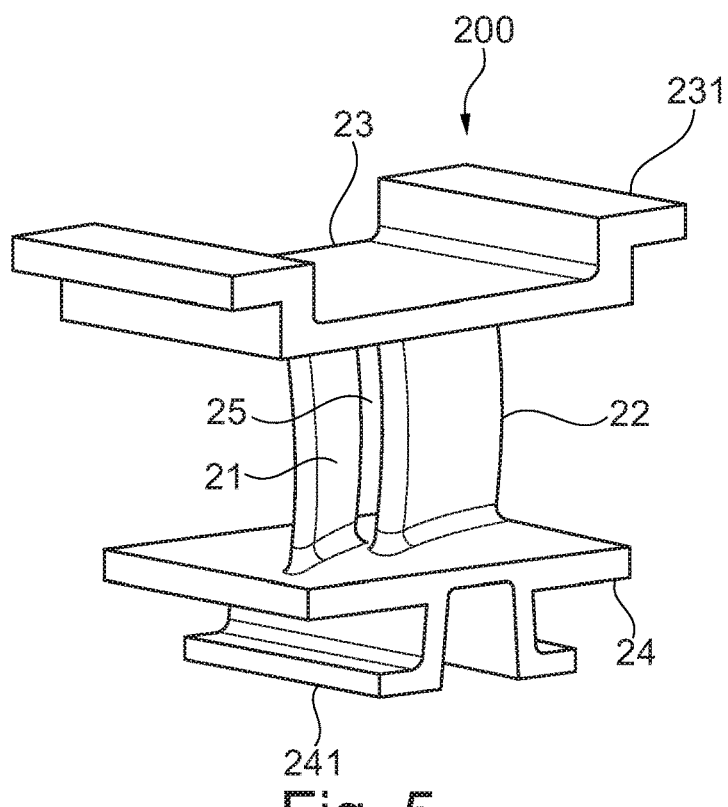
FIG. 5 shows a tandem guide vane segment manufactured according to a second manufacturing method.

FIG. 5 shows the result of a second manufacturing method, in which a tandem guide vane segment 200 consisting of two guide vanes 21, 22, an outer platform 23 with attachment structures 231, and an inner platform 24 with attachment structures 241, is manufactured completely integrally from one piece by means of a separation process, for example by means of a cutting method, such as for example a milling process.

Figure 6:
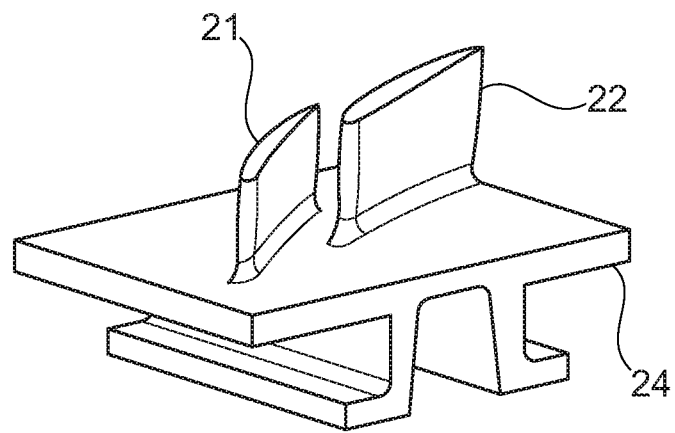
FIG. 6 shows partial areas of a tandem guide vane segment that is manufactured according to a third manufacturing method.

FIG. 6 shows an intermediate status in the manufacturing of a tandem guide vane segment according to a third manufacturing method, in which the tandem guide vane segment is manufactured by an additive manufacturing process (3D-Druck), with layer by layer being applied. The tandem guide vane segment manufactured in this manner can be refinished, for example in order to reduce the surface accuracy.

Figure 7:
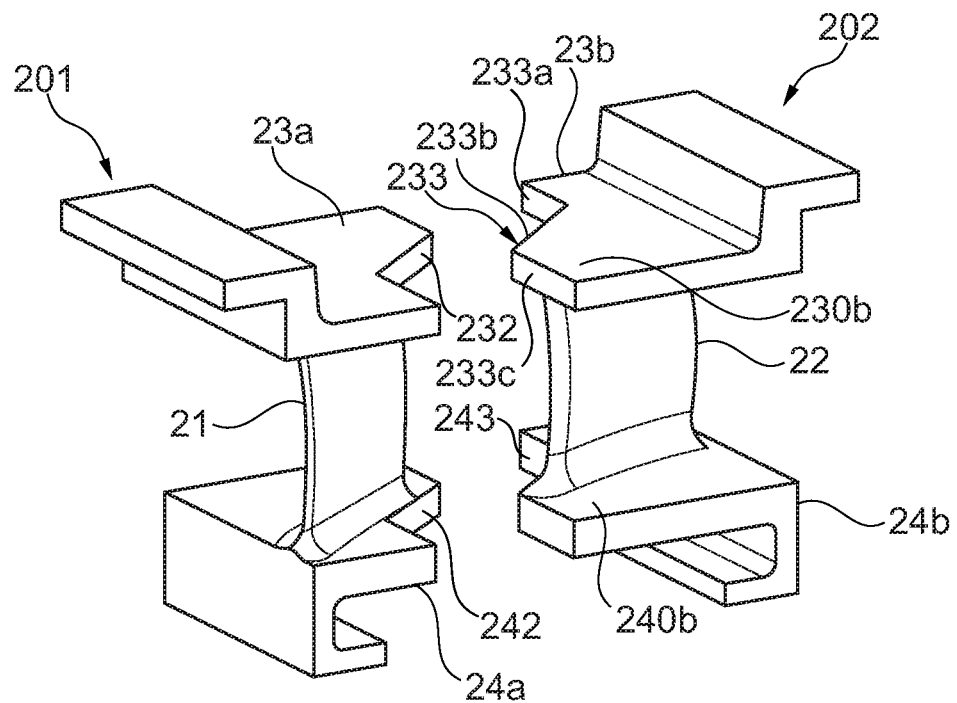
FIG. 7 shows an intermediate step in manufacturing a tandem guide vane segment according to a fourth manufacturing method, wherein an integral front segment section and an integral rear segment section are shown.

FIG. 7 illustrates a further manufacturing method, in which initially an integral front segment section 201 and an integral rear segment section 202 are manufactured. The integral front segment section 201 comprises the front guide vane 21, a front section 23a of the outer platform, and a front section 24a of the inner platform. The integral rear segment section 202 comprises the rear guide vane 22, a rear section 23b of the outer platform, and a rear section 24b of the inner platform.

The integral front segment section 201 and the integral rear segment section 202 are manufactured by means of a forging or casting method in combination with refinishing by means of a cutting process, for example.

It is provided that the front section 23a of the outer platform has a rear limiting line 232, and the front section 24a of the inner platform has a rear limiting line 242. Here, the two limiting lines 232, 242 are facing towards the rear segment section 202 and extend substantially in the circumferential direction when the finished tandem guide vane segment is installed inside the engine to form a stator. In a corresponding manner, the rear section 23b of the outer platform has a front limiting line 233, and the rear section 24b of the inner platform has a front limiting line 243, wherein the limiting lines 233, 243 are facing towards the limiting lines 232, 242. The connection of the front segment section 201 to the rear segment section 202 is realized through the connection of these parts along the limiting lines 232, 233 and 242, 243. Here, it is to be understood that strictly speaking the limiting lines are boundary surfaces as they have a radial expansion. The connection along the limiting lines is realized by means of hard soldering, for example.

Here, the special feature is that the front segment section 201 is formed in such a manner that the limiting line 232 of the outer platform and the limiting line 242 of the inner platform are both embodied in a Z-shaped manner. In a corresponding manner, the limiting lines 233 and 243 are also embodied in a Z-shaped manner. Thus, the limiting lines 232, 233, 242, 243 respectively have two parallel sections that are offset with respect to one another, as well as an obliquely extending section that connects these two sections. This is shown in an exemplary manner for limiting line 233, which has parallel sections 233a, 233c and a connecting section 233b.

Such an embodiment has multiple advantages. One advantage is that, due to the Z-shape, it is possible to completely cover the guide vanes 21, 22 by the respective sections 23a, 24a, 23b, 24b of the platforms, even though the guide vanes 21, 22 overlap in the finished state, so that they do not protrude beyond the respective limiting line 232, 233, 242, 243. For, due to its shape, the Z-shape provides an area that protrudes in the direction of the other section at each of the sections 23a, 24a, 23b, 24b of the outer platform and the inner platform where the respective guide vane 21, 22 has been formed. Thus, for example, the rear section 23b of the outer platform forms an area 230b that projects in the direction of the front section 23a, and the rear section 24b of the inner platform forms an area 240b that projects in the direction of the front section 24a, respectively completely covering the rear vane 22 that extends in between them, so that it is firmly structurally integrated.

Another advantage is that the Z-shape of the facing limiting lines 232, 233, 242, 243 of the two segment sections 201, 202 makes it possible to exactly position these two segment sections with respect to each other. For, the Z-shape provides a kind of stop collar in the circumferential direction, by means of which it can be ensured that the two segment sections 201, 202 can be connected to each other exactly in the desired relative position.

Alternatively, the limiting lines 232, 233, 242, 243 are formed not in a Z-shaped, but in an S-shaped manner. Also with an S-shape, areas protruding in the direction of the other segment section are provided.

Figure 8A:
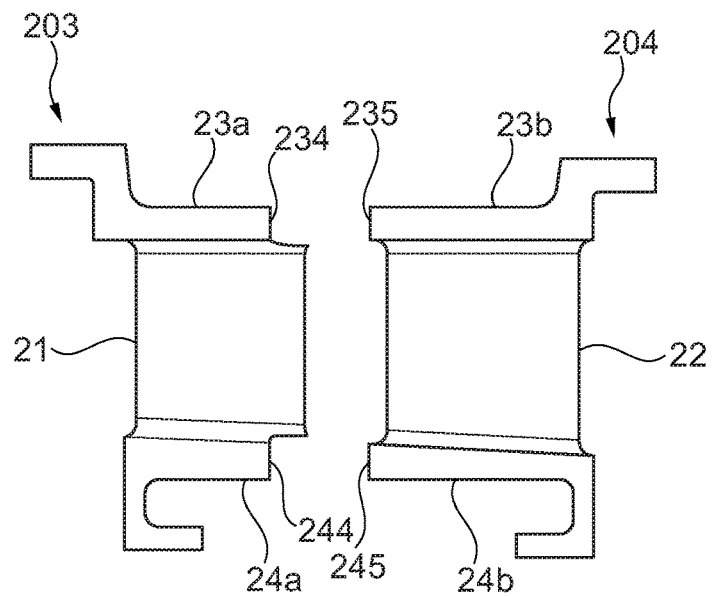
FIG. 8a shows an intermediate step in manufacturing a tandem guide vane segment according to a fifth manufacturing method, wherein an integral front segment section and an integral rear segment section are shown.
Figure 8B:
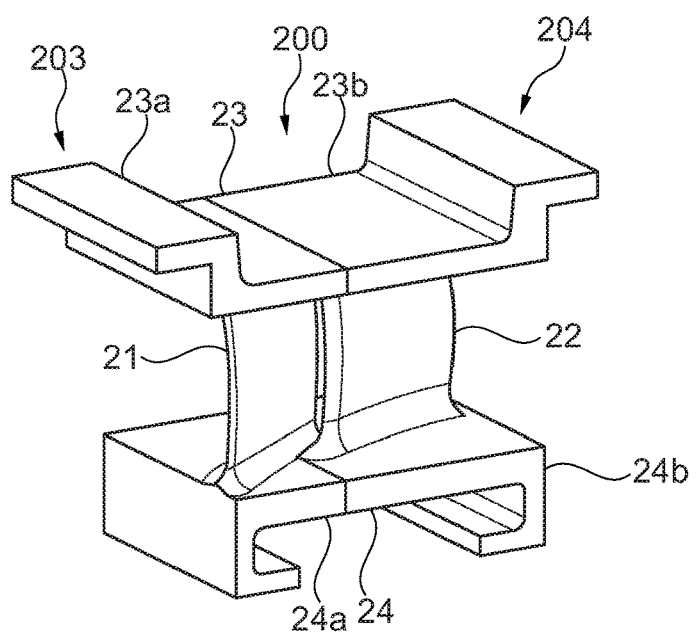

FIGS. 8a, 8b illustrate a further manufacturing method for a tandem guide vane segment that is related to the manufacturing method of FIG. 7. Also in the exemplary embodiment of FIGS. 8a, 8b, an integral front segment section 203 and an integral rear segment section 204 are initially manufactured. The front segment section 203 comprises a front section 23a of the outer platform, a front section 24a of the inner platform, and a front guide vane 21. The rear segment section 204 comprises a rear section 23b of the outer platform, a rear section 24b of the inner platform, and a rear guide vane 22. Similarly to FIG. 7, the sections 23a, 24a, 23b, 24b have respectively facing limiting lines 234, 244, 235, 245. However, they extend in a linear manner, wherein they are oriented substantially in the circumferential direction when the finished tandem guide vane segment is installed inside an engine to form a stator.

In order to achieve that the guide vanes 21, 22 still overlap in the finished state, the front guide vane 21 protrudes beyond the rear limiting lines 234, 244 in the direction of the rear segment section 204. Here, a gap is obligatorily formed between the protruding part of the guide vane 21 and the adjoining sections 23b, 24b of the outer and inner platform. Alternatively or additionally, it can be provided that the rear guide vane 22 protrudes beyond the front limiting lines 235, 245 in the direction of the front segment section 203.

The integral front segment section 203 and the integral rear segment section 204 are for example manufactured through a forging or a casting method (including metal powder injection molding) combined with a refinishing by means of a cutting method. The connection of the two segment sections 203, 204 is realized along the limiting lines 234, 244, 235, 245, for example by means of hard soldering.

Figure 9:
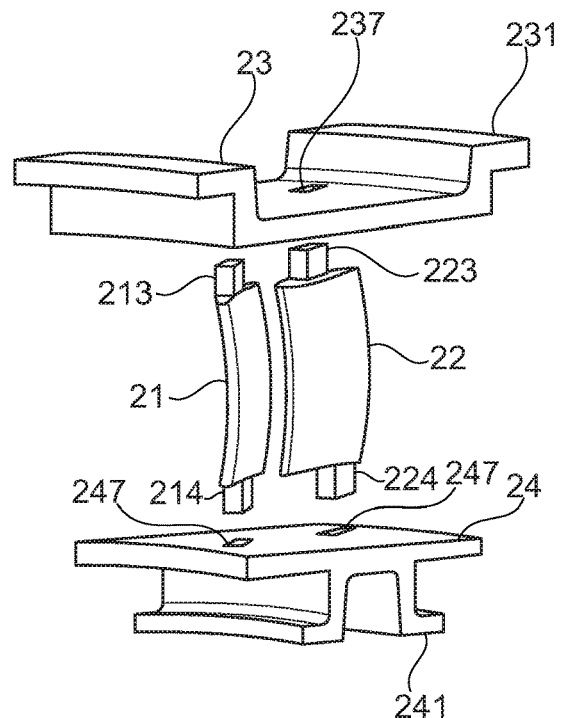
FIG. 9 shows an intermediate step in manufacturing a tandem guide vane segment according to a sixth manufacturing method, wherein all components of the tandem guide vane segment have initially been manufactured separately.

FIG. 9 illustrates a manufacturing method in which all components of the tandem guide vane segment are initially manufactured as separate parts. Thus, the front guide vane 21, the rear guide vane 22, the outer platform 23, and the inner platform 24 are manufactured as separate parts. What thus results is a completely modular system. The individual parts are manufactured by means of forging or metal powder injection molding, for example. Manufacturing into the final dimensions can respectively be performed, so that the parts only have to be connected to each other.

For the purpose of being connected, the parts have structures for a plug-in connection. Thus, it is provided in the shown exemplary embodiment that the guide vanes 21, 22 have projections 213, 223 at their radially outer ends, and projections 214, 224 at their radially inner end. Recesses 237 in the outer platform 23 and recesses 247 in the inner platform 24 correspond to these projections. The plug-in connections can be additionally secured, for example by means of hard soldering. Other embodiments of the form-fit connection can also be used as an alternative to the plug-in connections.

Figure 10:
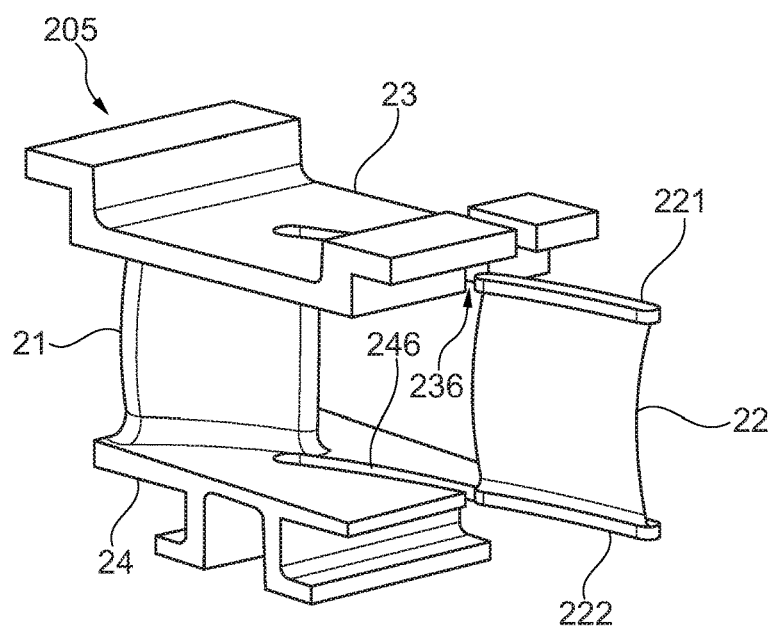
FIG. 10 shows an intermediate step in manufacturing a tandem guide vane segment according to a seventh manufacturing method, wherein an integral front segment section and a rear guide vane are shown.

FIG. 10 illustrates a further manufacturing method. Here, it is provided that the outer platform 23, one of the guide vanes (in the shown exemplary embodiment the front guide vane 21), and the lower platform 24 are manufactured as an integral structural component 205. The manufacturing is realized by means of a forging or a casting method in combination with refinishing using a cutting method, for example. In contrast, the other guide vane (in the shown exemplary embodiment the rear guide vane 22), is manufactured as a separate structural component. Here, it can be provided that the rear guide vane 22 is already manufactured exactly to the final dimensions. The manufacturing is performed by means of forging or metal powder injection molding, for example.

An elongated reception structure 236, for example in the form of a slit or a groove, is formed in the outer platform 23 for connecting the rear guide vane 22 to the integral structural component 205. In a corresponding manner and with the same orientation, an elongated reception structure 246 is formed in the lower platform 23. At its radially outer end 221 and at its radially inner end 222, the rear guide vane 22 has respectively one bulge 221, 222 of a shape that corresponds to the reception structure 236, 246. For the purpose of providing a connection, the rear guide vane 22 is inserted with its connecting structures 221, 222 into the elongated reception structures 236, 246 of the outer platform 23 and the inner platform 24. The connection can additionally be secured, for example by means of hard soldering.

In FIGS. 9 and 10, a connection of separately manufactured guide vanes to the outer platform 23 and the inner platform 24 was realized by means of plug-in connections or other form-fit connections. As will be illustrated in the following based on FIGS. 11 and 12, a connection of the vane and the platform can alternatively be realized by means of friction welding, for example.

Figure 11:
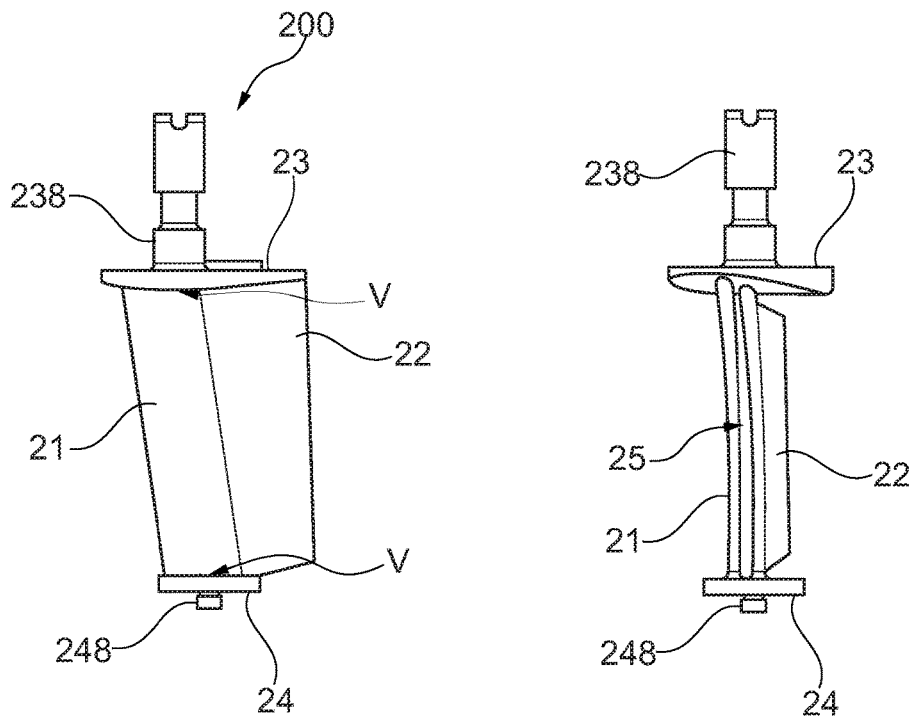
FIG. 11 shows a tandem guide vane segment manufactured according to an eighth manufacturing method, wherein the tandem guide vane segment is embodied so as to be rotatable and the two guide vanes overlap.

FIG. 11 illustrates such a manufacturing method. What is shown is a tandem guide vane segment 200 that, unlike the tandem guide vane segment shown before, is formed in an adjustable manner and has trunnions 238, 248 to provide rotatable mounting. The guide vanes 21, 22 overlap in the axial direction, forming gaps 25 which can be seen in the right-hand rendering of FIG. 11.

The guide vanes 21, 22 are connected to the platforms 23, 24 by means of a friction welding method. The weld seam is schematically indicated by V. Here, it is provided that the guide vanes 21,22 are manufactured with their final dimensions by means of forging or metal powder injection molding, for example. Traditionally, the platforms 23, 24 are manufactured by means of forging in combination with cutting methods, for example.

As for friction welding, it is provided that the guide vanes 21, 22 are exactly positioned and fixated inside a special tool. Subsequently, the outer platform 23 and the inner platform 24 are connected to the guide vane 21, 22 by means of friction welding. Due to the exact positioning and fixating of the guide vane 21, 22, it is ensured that its relative position as well as the gap 25 are exactly fixated. Subsequently, the created weld seam is mechanically processed until it is finished, for example by means of milling and lathing processes. It can also be provided that, following the friction welding process, the platforms 23, 24 including the trunnions 238, 248 are mechanically processed until they are finished.

Figure 12:
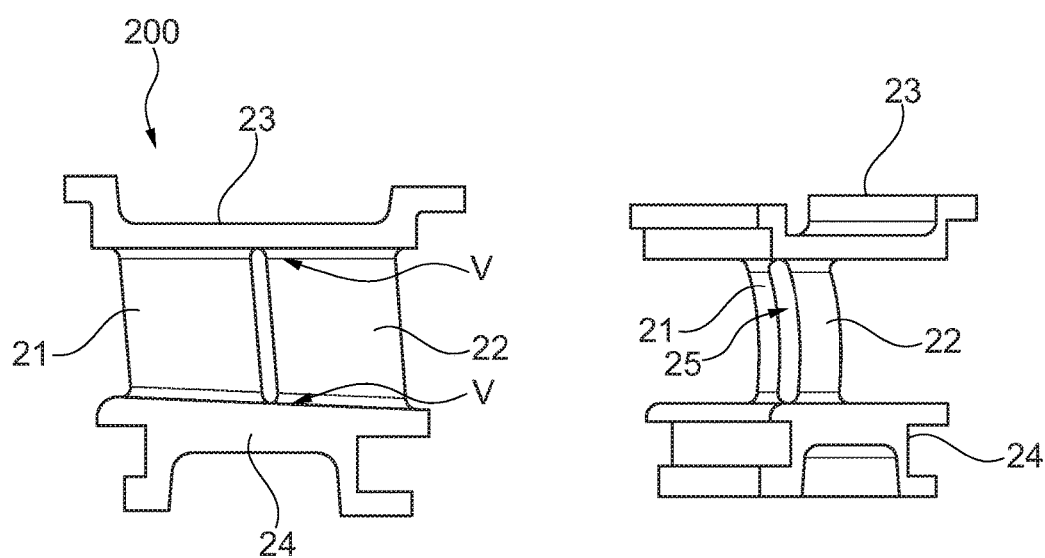
FIG. 12 shows a tandem guide vane segment manufactured according to the eighth manufacturing method, wherein the two guide vanes do not overlap.

FIG. 12 shows a further exemplary embodiment in which two guide vanes 20, 22 are connected to an outer platform 23 and an inner platform 24 by means of friction welding. In the exemplary embodiment of FIG. 12, the guide vanes 21, 22 are embodied in a non-overlapping manner. A gap 25 is present due to the axial offset. The weld seam is schematically indicated by V. The manufacturing is carried out in the same manner as described with respect to FIG. 11.

Figure 13:
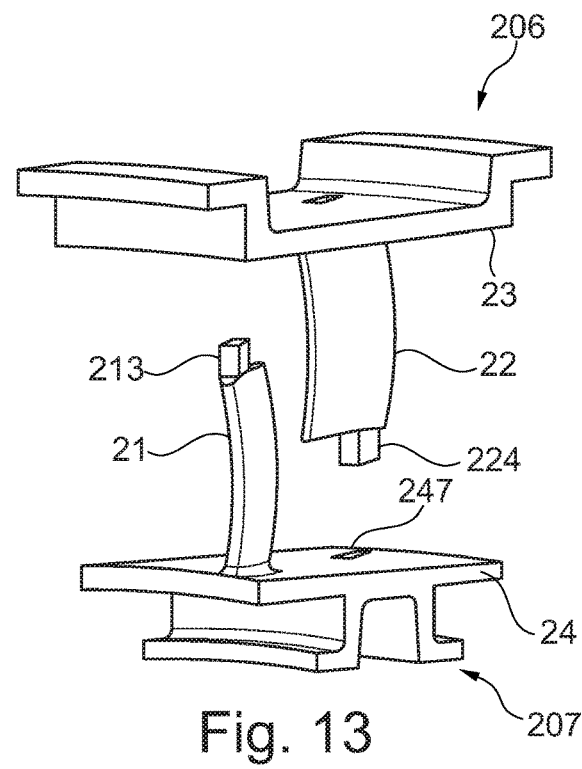
FIG. 13 shows an intermediate step in manufacturing a tandem guide vane segment according to a ninth manufacturing method, wherein an integral upper segment section and an integral lower segment section are shown.

FIG. 13 illustrates a further manufacturing method. Here, initially a first integral structural component 206 is manufactured, comprising the outer platform 23 and one of the guide vanes (in the shown exemplary embodiment the rear guide vane 22). Further, a second integral structural component 207 comprising the inner platform 24 and the front guide vane 21 is manufactured. The manufacturing of the two integral structural components 206, 207 is performed by means of a forging or casting method in combination with refinishing by means of a cutting process, for example.

The two integral structural components 206, 207 are connected by connecting the radially outer vane end of the front vane 21 to the platform 23, and the radially inner vane end of the vane 22 to the inner platform 24. This is for example realized by means of plug-in connections, wherein the guide vanes have projections 213, 224 at their ends, which are inserted into corresponding recesses in the outer platform 23 and the inner platform 24, wherein only the recess 247 in the inner platform 24 is visible. The plug-in connection can be further secured, for example by means of hard soldering. At that, the form of the shown connection is understood to be merely an example.

Figure 14:
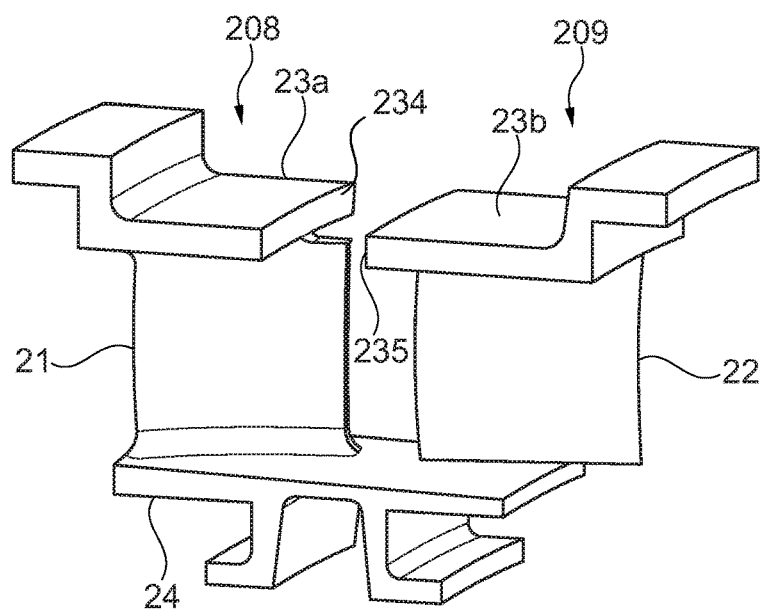
FIG. 14 shows an intermediate step in manufacturing a tandem guide vane segment according to a tenth manufacturing method, wherein an integral front segment section and an integral rear segment section are shown.

FIG. 14 illustrates a further manufacturing method that has similarities to the manufacturing method of FIG. 7 and of FIGS. 8a, 8b. Thus, a front integral segment section 208 is manufactured, comprising the front guide vane 21, a front section 23a of the outer platform, and the entire inner platform 24. Further, a rear integral segment section 209 is manufactured, comprising the rear guide vane 22 and a rear section 23b of the outer platform. At that, the rear guide vane 22 is embodied as a cantilever, i.e. without further structures at its radially inner end. The two segment sections 208, 209 are manufactured by means of a forging or a casting method, for example. In addition, a cutting processing may be performed on the forged or cast part.

The connecting of the two segment sections 208, 209 is carried out according to the method described with respect to FIGS. 8a, 8b, wherein rectilinear limiting lines 234, 235 are connected to each other at the front section 23a and at the rear section 23b of the outer platform.

It is pointed out that, in all described exemplary embodiments, the outer platform and the inner platform have linear lateral boundaries extending in the axial direction in the finished manufactured state, according to the rendering of FIG. 3a. However, this is to be understood merely as an example, and is not necessarily the case.

The present invention is not limited in its embodiment to the above-described exemplary embodiments. For example, the shown shapes of the guide vanes, of the upper platform and of the lower platform are to be understood merely as examples.

It is furthermore pointed out that the features of the individually described exemplary embodiments of the invention can be combined in various combinations with one another. Where areas are defined, they include all the values within these areas and all the sub-areas falling within an area.

What is claimed is:

1. A method for manufacturing a tandem guide vane segment that comprises an outer platform, a front guide vane, and a rear guide vane, wherein the front guide vane and the rear guide vane are arranged fixedly spaced apart on the outer platform with the front guide vane overlapping the rear guide vane by a fixed distance in an axial direction, wherein the method comprises:
    manufacturing an integral front segment section that comprises the front guide vane and a front section of the outer platform;
    manufacturing an integral rear segment section that comprises the rear guide vane and a rear section of the outer platform;
    connecting the integral front segment section and the integral rear segment section;
    manufacturing the integral front segment section to include a rear limiting line to the integral rear segment section in an area of the outer platform;
    manufacturing the integral rear segment section to include a front limiting line to the integral front segment section in the area of the outer platform;
    wherein the integral front segment section and the integral rear segment section form a connection along the rear limiting line and the front limiting line, wherein the connection has at least one chosen from an S-shape and a Z-shape; and
    wherein the front guide vane does not protrude beyond the rear limiting line, and the rear guide vane does not protrude beyond the front limiting line.

2. The method according to claim 1, further comprising manufacturing the tandem guide vane segment to include an inner platform, wherein the integral front segment section further comprises a front section of the inner platform, and the integral rear segment section further comprises a rear section of the inner platform.

3. The method according to claim 2, further comprising:
    manufacturing the integral front segment section to include a second rear limiting line to the integral rear segment section in an area of the inner platform;
    manufacturing the integral rear segment section to include a second front limiting line to the integral front segment section in the area of the inner platform;
    wherein the integral front segment section and the integral rear segment section form a connection along the second rear limiting line and the second front limiting line in the area of the inner platform, wherein the connection is one chosen from an S-shape and a Z-shape; and
    wherein the front guide vane does not protrude beyond the second rear limiting line, and the rear guide vane does not protrude beyond the second front limiting line.

4. The method according to claim 1, further comprising manufacturing the tandem guide vane segment to include an inner platform, wherein the inner platform is formed integrally only with the front segment section.

5. The method according to claim 1, further comprising:
    manufacturing the tandem guide vane segment with exactly one front guide vane and exactly one rear guide vane.

6. The method according to claim 1, further comprising:
    manufacturing the tandem guide vane segment with a plurality of front guide vanes arranged at a distance from each other in a circumferential direction;
    manufacturing the tandem guide vane segment with a plurality of rear guide vanes arranged at a distance from each other in the circumferential direction; and manufacturing a tandem vane which includes one front guide vane from the plurality of front guide vanes and one rear guide vane from the plurality of rear guide vanes.

* * * * *